Oct. 10, 1950 A. D. BLUMLEIN 2,525,089
RADIO LOCATOR SYSTEM
Filed Oct. 24, 1946
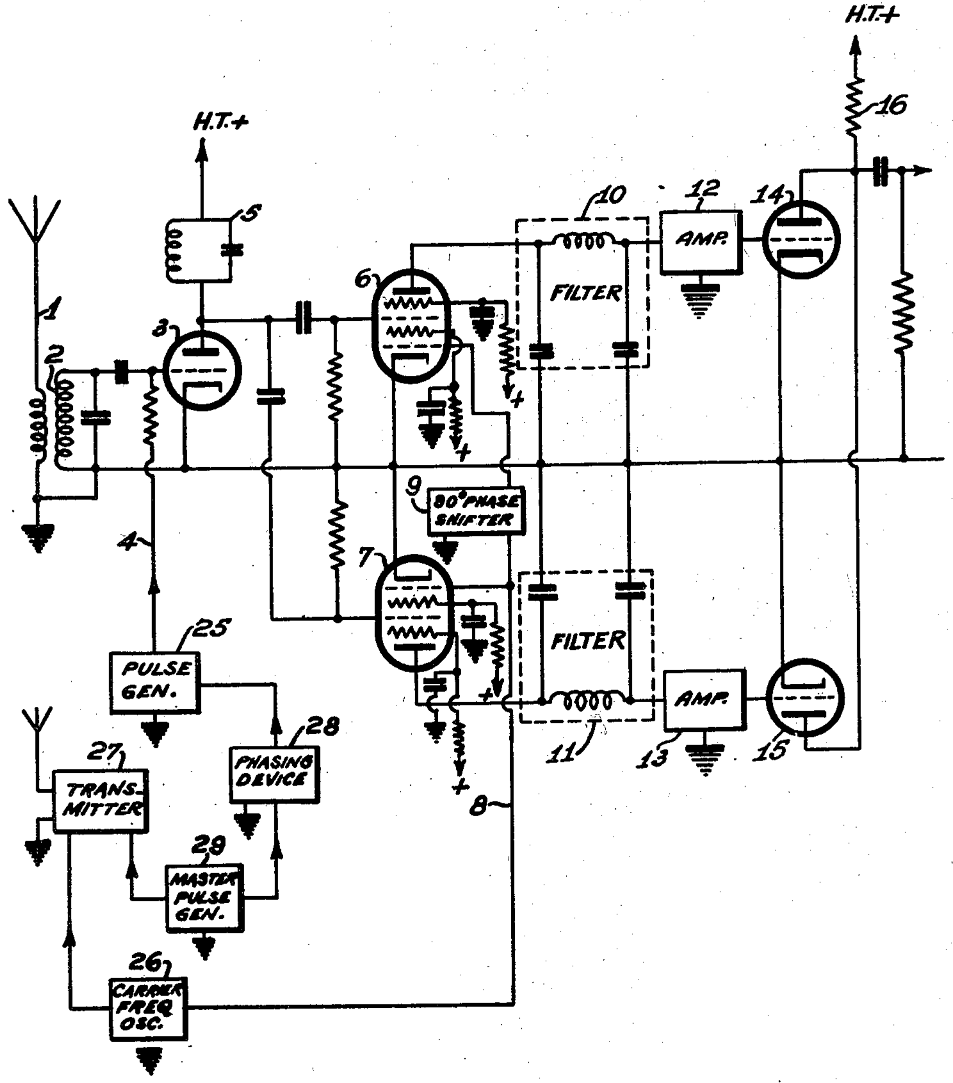
INVENTOR.
Alan Dower Blumlein, Deceased
Doreen Walker, Executrix
BY H. G. Grover
ATTORNEY Patented Oct. 10, 1950 2,525,089

UNITED STATES PATENT OFFICE 2,525,089

RADIO LOCATOR SYSTEM

Alan Dower Blumlein, deceased, late of London, England, by Doreen Walker, executrix, Lescudjack, Penzance, Cornwall, England, assignor to Electric and Musical Industries, Limited, a British company Application October 24, 1946, Serial No. 705,279
In Great Britain January 10, 1940

Section 1, Public Law 690, August 8, 1946
Patent expires January 10, 1960

4 Claims. (Cl. 343—13)

This invention relates to improvements in radio receivers in which incoming modulated oscillations are mixed with an unmodulated oscillation having substantially the same frequency as the said modulated oscillations and an output signal representative of the modulation of said incoming signal is derived from said mixed signals.

In such receivers, the amplitude of the output signal representative of the modulation of the incoming modulated oscillations is dependent upon the phase relationship between said modulated oscillation and the unmodulated oscillation with which it is mixed, the amplitude of said output signal being a maximum when the said carrier wave and unmodulated oscillation are in phase or in anti-phase and a minimum when they are in phase quadrature. Thus, changes in the phase relationship between these two oscillations may give rise to substantial changes in the amplitude of said derived signal.

It is the object of the present invention to provide a method of reception in which variations in the amplitude of the output signal due to such phase changes are reduced or eliminated.

According to the present invention, there is provided a method of reception of amplitude modulated oscillations comprising mixing said modulated oscillations with unmodulated oscillations of substantially the same frequency as said modulated oscillations, selecting from said mixed oscillations the difference frequency component, deriving one or more difference frequency components by mixing said modulated oscillations with unmodulated oscillations displaced in phase by a predetermined amount from said first mentioned unmodulated oscillations, and combining said components in the same sense so as to produce an output signal, said signals being combined in such manner that variation in the amplitude of said output signal due to variation in the phase angle between said modulated and said unmodulated oscillations is reduced. Said signals may conveniently be combined by adding them after their amplitudes have been squared so as to produce said output signal, and in this case said output signal may be made substantially independent of the phase angle between said modulated and unmodulated oscillations if said unmodulated oscillations are in polyphase relation as for example in quadrature when two such oscillations are used or differ from each other in phase by 120° when three unmodulated oscillations are used.

If desired, a further signal having an amplitude proportional to the square root of the amplitude of said output signal may be derived, said further signal then being representative of the modulation of said modulated oscillations.

According to a further feature of the invention, there is provided apparatus for the reception of amplitude modulated oscillations comprising means for separately mixing with said modulated oscillations two or more unmodulated oscillations of substantially the same frequency as said modulated oscillations and differing in phase from each other by a predetermined amount or amounts, means for selecting from each of said mixed oscillations a difference frequency component, means for squaring the amplitude of said components and means for adding said squared components to provide an output signal, the arrangement being such that if the phase difference between said unmodulated oscillation is suitably chosen, the amplitude of said output signal is in operation substantially independent of the phase angle between said modulated oscillations and said unmodulated oscillations.

Said apparatus may comprise means for deriving a further signal having an amplitude proportional to the square root of said output signal, whereby in operation said further signal is representative of the modulation of said modulated oscillations.

According to another feature of the invention there is provided apparatus for detecting or determining the distance or position of a reflector of oscillations comprising receiving apparatus according to any of the above mentioned features and in addition means for deriving from said difference frequency components a correction signal and for utilizing said correction signal to control the frequency of said modulated or unmodulated oscillations so as to reduce changes in the difference between the frequencies thereof due to the motion of said source and consequent changes of the frequency of said modulated oscillations reflected thereby.

Conveniently, two unmodulated carrier waves in phase quadrature may be used, the derived outputs being squared in amplitude and then added.

The derived signals may be fed to a system of coils so arranged that a resultant magnetic field is set up and changes in the direction of said resultant field arising from changes in the frequency of said unmodulated carrier wave, or the carrier wave of said signal may be utilized to correct such frequency changes.

The invention is particularly applicable to the system for the determination of the position and distance of reflecting objects described in my U. S. patent application Serial No. 446,971, filed June 13, 1942, now Patent No. 2,433,681, issued December 30, 1947, and entitled Apparatus for Use with Recurrent Electrical Signals. The application of one form of the invention to such a system will now be described with reference to the accompanying drawing which shows the general schematic circuit diagram of the apparatus used in carrying out the invention.

Referring to the drawing, it will be assumed that the signals received in the aerial circuit are signals reflected from the reflecting object, such as aircraft, the position and distance of which are to be determined in the manner described in my above-mentioned U. S. application and in the specification of U. S. application Serial No. 446,970, filed June 13, 1942 in the name of Alan D. Blumlein et al., now Patent No. 2,406,316, issued August 27, 1946, and entitled Radio Pulse System with Interference Eliminator. It will be assumed that these signals consists of "bursts" of high frequency oscillations of approximately 0.5 microsecond duration occurring every 200 microseconds, the frequency of said oscillations being 100 megacycles/sec. The signals received in the aerial circuit 1 are transferred by any known coupling means such as a mutual inductance to the oscillatory circuit 2 tuned to 100 megacycles/sec. and having a relatively wide pass band. The voltages set up across the circuit 2 are applied to a control electrode of the valve 3, which is normally biassed so as not to transmit signals, but is supplied from a pulse generator 25 with positive switching pulses along the conductor 4 so as to render it operative for short periods of time at regularly recurrent intervals in the manner described in the specifications of the above-identified applications Serial No. 446,970 and Serial No. 446,971.

The switching pulses may be properly phased by means of a phasing device 28 through which the pulse generator 25 is triggered by pulses supplied from the master pulse generator 29. The generator 29 also supplies modulating pulses to the transmitter 27. The signals appearing in the anode circuit of the valve 3 set up voltages across the impedance 5, which may be an oscillatory circuit having a decrement much longer than circuit 2 for the purpose explained in the specifications above referred to, and these voltages are fed to one of the control electrodes of each of the hexode valves 6 and 7, if desired, after further amplification by additional valves similar to valve 3. It will be appreciated that due to the finite time required for the signal to build up in the circuits 2, 5, etc., the timing of the switching pulses applied to successive amplifying valves 3 must be slightly delayed in relation to each other to ensure that the pulses are applied to each valve 3 in the same timing relation to the signal.

The other control electrodes of the hexodes 6 and 7 are fed with unmodulated oscillations having substantially the same frequency as the incoming signals. Such oscillations may be conveniently derived from the master oscillator 26 of the transmitter 27 used for transmitting the signals which are reflected to the receiver by said reflecting objects, and may be fed along conductor 8 to a control electrode of the hexode 7 and thence via a phase changing device 9 to a control electrode of the hexode 6, the device 9 being arranged to provide a phase change of 90°. The device 9 may take the form of a network comprising series tuning shunt arms and a parallel tuned series arm.

Due to the multiplicative controlling effect of the two control electrodes of each of the hexodes 6 and 7, there will appear in the anode circuits of each of said hexodes in addition to high frequency components a modulated difference frequency component. It will be understood that if the frequencies of said modulated and unmodulated oscillations are exactly equal, the difference frequency will be zero and the modulated difference frequency component will then have the same waveform as the original modulation, the amplitude of said component being proportional to the phase difference between said oscillation. These components will have amplitudes proportional to sin $\theta$ and cos $\theta$, respectively, where $\theta$ is the phase angle between the incoming modulated oscillation and one of said unmodulated oscillations, since said unmodulated oscillations applied to said hexodes are in phase quadrature. The high frequency components are removed by means of the filters 10 and 11, which may be low pass filters of well known form, and said modulated difference frequency components are fed to the amplifiers 12 and 13, respectively.

The output of the amplifier 12 is fed to the input circuit of the valve 14, which is arranged to operate with a square law characteristic, i. e., to provide an output proportional to the square of the amplitude of the applied signal. In order to give a square law, the valve 14 may be biassed so that it is only operated over the lower curved portions of its anode current/grid voltage characteristic. A further valve 15 is similarly arranged to square the output of the amplifier 13.

The output circuits of the valves 14 and 15 are provided with the output impedance 16 in common, with the result that their outputs are effectively added and the voltages appearing across the impedance 16 is therefore the sum of the squares of the amplitudes of the signals from the amplifiers 12 and 13, and as these latter output signals are proportional to $\sin^2 \theta$ and $\cos^2 \theta$, the amplitude of the output signal appearing across the impedance 16 will be independent of the phase relationship between the incoming modulated oscillations and the unmodulated oscillations with which it is mixed in the valves 6 and 7.

Since the amplitude of the output signal is independent of the phase relationship between the modulated and unmodulated oscillations, it will be appreciated that changes in phase between said oscillations will have substantially no effect upon the amplitude of the received signal. Thus, if the frequencies of the oscillations are equal, changes in the fixed phase angle between them will not cause a change in amplitude of the output signal, and if the frequencies are slightly different so that there is a continuous change of phase, the amplitude of the output signal will again be unaffected so that the output signal will not be of difference frequency but will have a waveform similar to that which the modulation waveform would have after having been passed through a square law amplifier. In the present application the precise nature of the modulation is of little importance as it is only required to detect the existence of the reflected signal or to measure its time of arrival. However, in other applications it may be desirable to correct the distortion of the modulation and this may conveniently be done by deriving a further signal from said output signal by means of an amplifier incorporating a valve so biassed and arranged that its output current or voltage is proportional to the square root of the input voltage applied to it.

Each of the amplifiers 12 and 13 may include one or more amplifying valves, and in order to reduce the effects of noise, etc., preferably includes a storage device, which may consist of a circuit of low damping tuned to the frequency of recurrence of the signals, namely, 5,000 cycles/sec., the effect of such storage device and the aforementioned switching of the carrier frequency amplifying stages 3, etc., being to augment the wanted signal in relation to noise, etc., due to the regular recurrence of the former in the manner explained in the specifications of the above-identified applications Serial No. 446,970 and Serial No. 446,971. In the present case, due to the fact that the reflecting objects may not be stationary and the frequency of the incoming reflected signal may depart from the frequency of the transmitted oscillations, the pass band of the tuned circuits constituting the storage devices of the amplifiers 12 and 13 should preferably be 5000 plus or minus 200 cycles/sec.

The outputs from the amplifiers 12 and 13 may me utilized prior to the "squaring" process to compensate for the phase differences between the incoming reflected modulated oscillations and the unmodulated oscillations arising from the motion of the reflecting object. The output from each of the amplifiers 12 and 13 may, for example, be fed to a pair of coils, the two pairs of coils being arranged at right angles in the manner of the fixed coils of a goniometer. As the two outputs are proportional to sin $\theta$ and cos $\theta$, respectively, the resultant field set up by the coils will be inclined at an angle to the axis of one of said pairs of coils. Any change in the velocity of the reflecting object towards or away from the receiving aerial will cause a change in the direction of the resultant field set up by said coils, and this change may be utilized to change the frequency of either the transmitted carrier wave or the unmodulated carrier oscillation with which the received signals are mixed in such manner that this change in the direction of said resultant field is reduced as described in the specifications of the above-identified applications Serial No. 446,970 and Serial No. 446,971.

For example, a laminated iron salient pole armature may be mounted free to rotate in said field. Said armature will tend to align itself with the resultant field and will rotate as said resultant field rotates due to a change in $\theta$. This rotation may be then used to drive through suitable gearing a control of the frequency of either of the above-mentioned oscillations, said control being such as to alter one of said frequencies in such a sense as to annul the rotation of said resultant field.

As both the transmitted oscillations and the unmodulated oscillations are preferably derived from a common master oscillator source, this frequency change is preferably effected by means of a continuously variable phase shifting device inserted between the master oscillator and the mixing hexode valves 6 and 7 (or between the master oscillator and the transmitter). Such a phase shifting device may comprise a goniometer-like structure of two fixed coils at right angles and one rotatably mounted moving coil which may be rotated to couple in any sense with either fixed coils. The oscillations are applied in phase quadrature to the fixed coils and the adjustable phase output taken from the moving coil.

The moving coil may then be rotated by a suitable motor whose speed and sense of rotation is controlled by a suitable voltage control, which control is actuated by the movement of the above-mentioned salient pole armature. The rotation of this armature will thus adjust the sense and speed of rotation of the moving coil of the phase-shifting device to increase or decrease the frequency of the unmodulated oscillations so as to hold $\theta$ substantially constant.

As explained in the above-identified U. S. application Serial No. 446,971, it is necessary to adjust the timing of positive switching pulses applied to lead 4 in accordance with the distance of the aircraft being observed. The rotation of the motor above referred to is related to the change of distance of the aircraft so that this motor may be used to drive automatically the adjustment of pulse timing representative of the aircraft position.

Once the devices described above are operative to reduce the phase rotation, by stabilizing the pulse frequency passed to amplifiers 12 and 13, the band width of these amplifiers may be further reduced to improve noise to signal ratio. For example, the band width may then be reduced to, say, 500±50 C. P. C.

Although the invention has been described with reference to two hexode mixers only, it will be appreciated that more than two such mixers may be employed if corresponding changes are made in the phase relationship of the incoming signals. For example, three such mixers may be employed and the carrier oscillations applied to each arranged to differ in phase by 120°.

The three modulated difference frequency components may either be amplified in separate amplifiers, or in a three-phase amplifier, the amplifier valves being arranged in groups of three having a high common cathode impedance. The anodes may be coupled by three impedances to the next group of three, or alternatively, transformer couplings similar in winding arrangement to those used for three-phase power circuits may be used. The three amplified components are then squared and added so that the amplitude of the output signal is rendered independent of the phase between the incoming modulated signal and the unmodulated oscillation.

It will also be appreciated that the difference frequency components may be combined in other ways so as to provide an output signal which is less dependent upon changes in phase between the modulated and unmodulated oscillations than would normally be the case. Thus, the squaring process may be omitted and the difference frequency components added in the same sense, i. e., in the same polarity, by means of suitable phase reversing devices of unilaterally conducting devices, arranged to reverse the polarity or sense of some of said components so as to prevent different components from opposing each other. The output signal will then be less variable with phase than any one of the difference frequency components taken separately. Any number of difference frequency components derived from unmodulated oscillations of different phase may be combined in this manner.

What is claimed is:

1. The method of detecting or determining the position or distance of a source of modulated oscillation such as a reflector comprising receiving amplitude modulated oscillations, separately mixing said modulated oscillations with at least two unmodulated oscillations of substantially the same frequency as said modulated oscillations and differing in phase from each other by a predetermined amount or amounts, selecting from each of said mixed oscillations a difference frequency component, and combining said difference frequency components in the same sense or polarity whereby variations in the amplitude of the resulting output signal due to variation in the phase angle between said modulated and said unmodulated oscillations are minimized.

2. Apparatus for the reception of amplitude modulated oscillations comprising means for separately mixing with said modulated oscillations at least two unmodulated oscillations of substantially the same frequency as said modulated oscillations and differing in phase from each other by a predetermined amount or amounts, means for selecting from each of said mixed oscillations a difference frequency component, means for squaring the amplitude of said components and means for adding said squared components to provide an output signal, the phase difference between said unmodulated oscillations being such that they have a polyphase relation whereby the amplitude of said output signal is in operation substantially independent of the phase angle between said modulated oscillations and said unmodulated oscillations.

3. A pulse echo radio locator system comprising transmitter means for transmitting pulses of radio energy, said transmitter means comprising a source of carrier wave energy and means for pulse modulating said carrier wave energy to produce said pulses of radio energy, said system further comprising apparatus for receiving said transmitted pulses after reflection from a reflecting object, said receiving apparatus comprising means for separately mixing with said pulse modulated carrier wave oscillations at least two unmodulated oscillations of substantially the same frequency as said pulse modulated oscillations and differing in phase from each other by a predetermined amount or amounts, said unmodulated oscillations being derived from said source of carrier wave energy, means for selecting from each of said mixed oscillations a difference frequency component, means for squaring the amplitude of said components and means for adding said squared components to provide an output signal, the phase difference between said unmodulated oscillations being such that they have a polyphase relation whereby the amplitude of said output signal is in operation substantially independent of the phase angle between said modulated oscillations and said unmodulated oscillations.

4. Apparatus for the reception of amplitude modulated oscillations comprising means for separately mixing with said modulated oscillations at least two unmodulated oscillations of substantially the same frequency as said modulated oscillations and differing in phase from each other by a predetermined amount or amounts, means for selecting from each of said mixed oscillations a difference frequency component, and means for adding said difference frequency components in the same sense or polarity to provide an output signal, whereby the amplitude of said output signal has an amplitude that varies a reduced amount due to variations in the phase angle between said modulated oscillations and said unmodulated oscillations.

DOREEN WALKER,
*Executrix of Alan Dower Blumlein, Deceased.*

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 1,945,952 | Nicolson | Feb. 6, 1934 |
| 2,044,745 | Hansell | June 16, 1936 |